RE 25105
Nov. 18, 1958      W. W. CARGILL, JR      2,861,166
METHOD AND APPARATUS FOR HOT MACHINING
Filed March 14, 1955      2 Sheets–Sheet 1
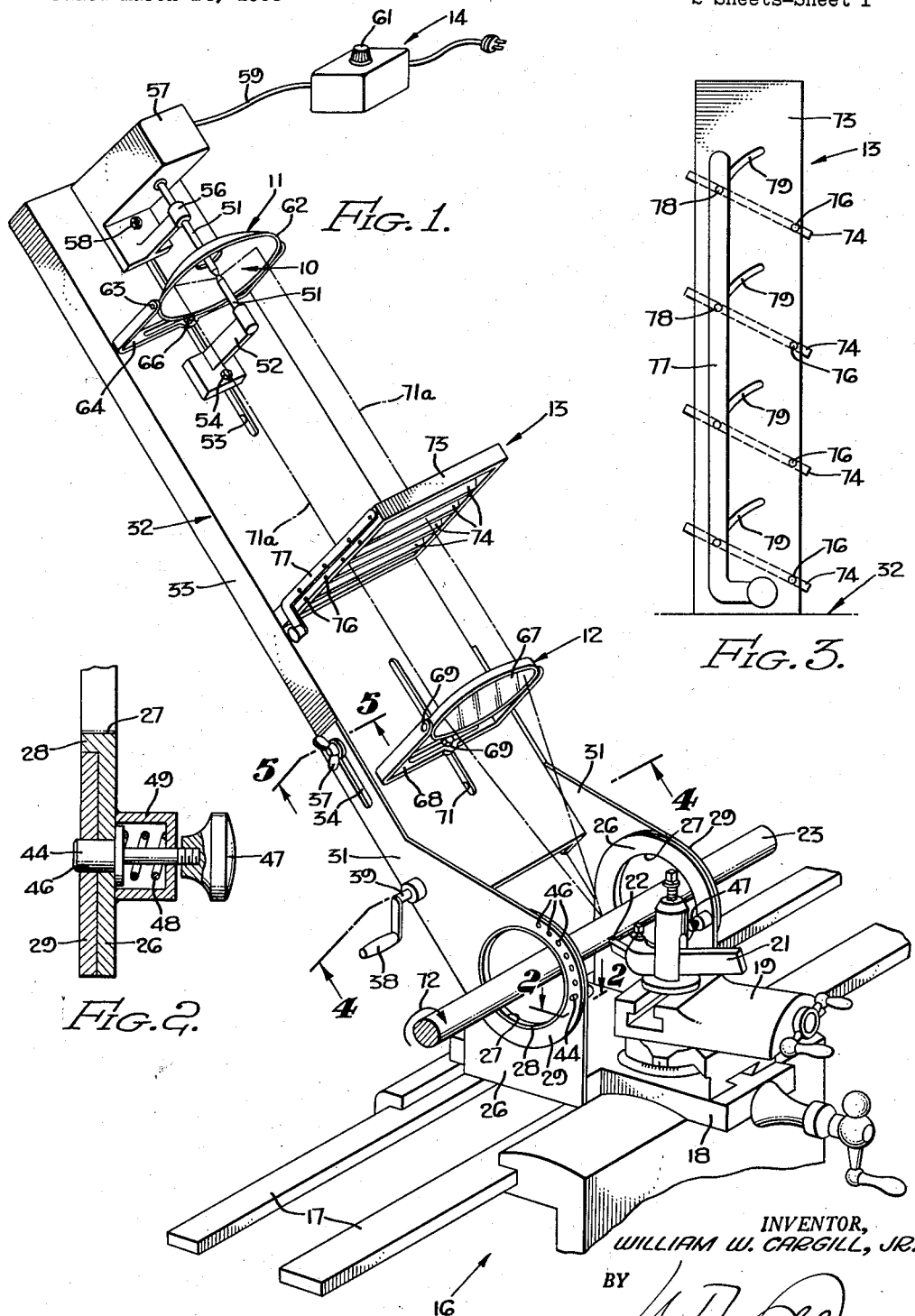
INVENTOR,
WILLIAM W. CARGILL, JR.
BY
ATTORNEY Nov. 18, 1958 W. W. CARGILL, JR 2,861,166
METHOD AND APPARATUS FOR HOT MACHINING
Filed March 14, 1955 2 Sheets-Sheet 2
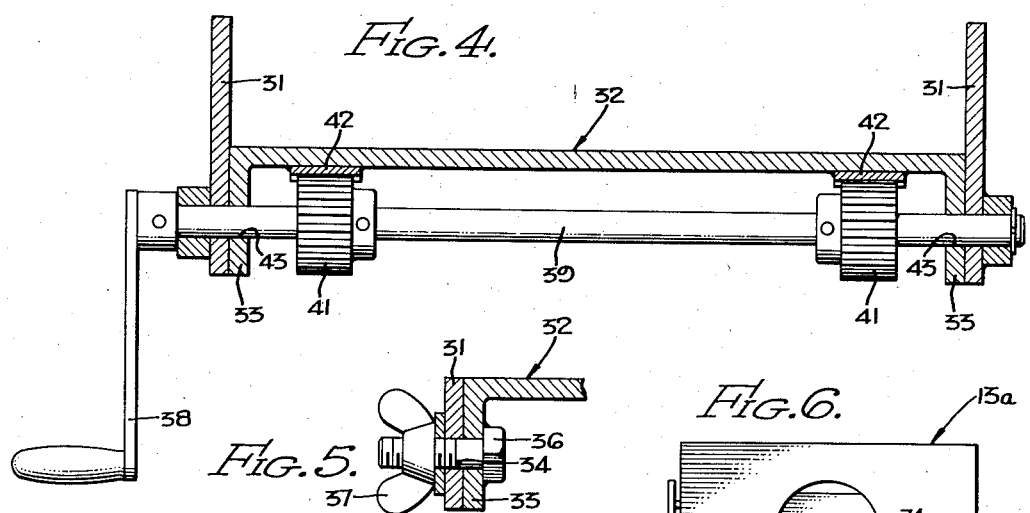
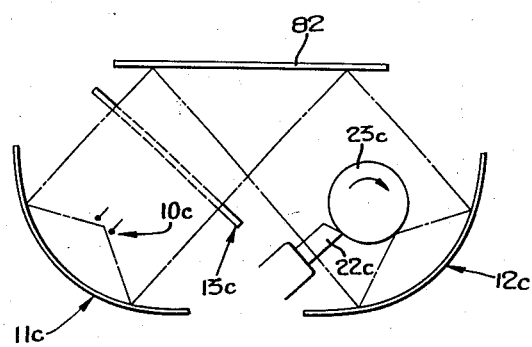
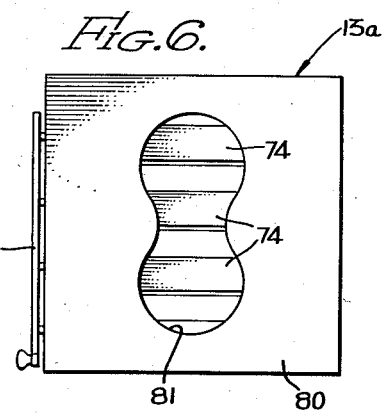
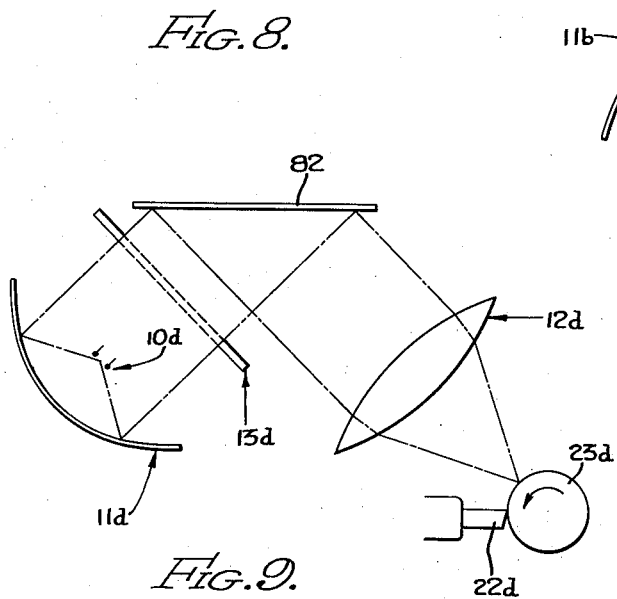
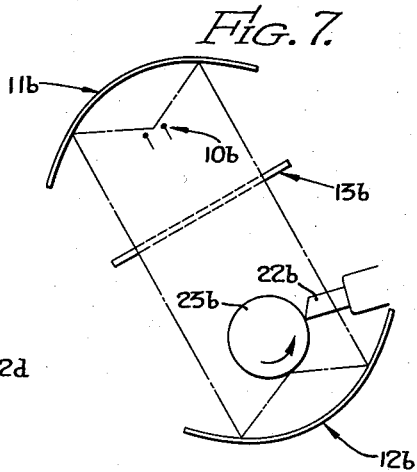
INVENTOR,
WILLIAM W. CARGILL, JR.
BY
ATTORNEY

United States Patent Office 2,861,166
Patented Nov. 18, 1958

2,861,166
METHOD AND APPARATUS FOR HOT MACHINING

William W. Cargill, Jr., Los Angeles, Calif.

Application March 14, 1955, Serial No. 494,082

18 Claims. (Cl. 219—34)

This invention relates to method and apparatus for heating a workpiece from a distance, and more particularly to a method and apparatus for hot machining and hot working metals, plastics and other materials both electrically conductive and electrically non-conductive.

It is recognized that the proper application of heat to a workpiece, immediately prior to machining or working the same, will enable greater stock removal for a given power application. Furthermore, hot machining frequently produces finer finishes and results in increased tool life, as well as making possible the machining of many materials that may not practicably be machined by conventional cold machining methods. In view of the distinct advantages to be obtained by hot machining, prior workers have heretofore resorted to the heating of the workpiece by flame means, induction heating means, and other means in which the heat source is adjacent to the workpiece. Such means, however, were deficient in that it was impossible or impractical to apply the proper controlled amount of heat to the desired area of the workpiece, particularly where the workpiece was a plastic or other non-conducting material. Stated otherwise, it is imperative, for reasons of economy and accuracy, that a controlled amount of heat be applied to a predetermined area of the workpiece a definite distance away from the cutting or working element, and that such heated area be substantially coextensive with the area which is cut or worked. It will be understood that induction or resistance heating cannot operate to apply the proper amount of controlled heat to a predetermined extremely small area adjacent the cutting or working tool, and that flame means are also relatively inaccurate and not susceptible of the control necessary to produce optimum results.

In view of the above factors characteristic of the field of hot machining, it is an object of the present invention to provide a method and apparatus for heating a predetermined relatively small area of a workpiece to the necessary temperature in a substantially instantaneous manner, and regardless of whether the workpiece is electrically conductive or electrically non-conductive.

A further object of the invention is to provide an improved method and apparatus for heating a workpiece by use of an energy source disposed a substantial distance from such workpiece, and to provide improved means for controlling the amount of energy transmitted from the source to the workpiece.

An additional object is to provide means to control the application of heat to an area on a workpiece, to control the boundaries of such area on the workpiece, and to control the temperature of the workpiece within such boundaries.

An additional object of the invention is to provide a means and a method for applying controlled heat to predetermined areas of workpieces both electrically conductive and electrically non-conductive, and to workpieces to which flame may not be applied.

These and other objects and advantages of the invention will be more fully set forth in the following specification and claims when considered in connection with the attached drawings to which they relate.

In the drawings:

Figure 1 is a pictorial view illustrating one form of apparatus for carrying out the present invention, the apparatus being being shown as employed in the heating of a workpiece in a lathe;

Figure 2 is an enlarged detail sectional view along line 2—2 of Figure 1;

Figure 3 is an enlarged side elevational view of the device for controlling the amount of radiant heat energy transmitted between the director means and the workpiece;

Figure 4 is an enlarged transverse sectional view taken along line 4—4 of Figure 1, and showing the means for shifting the heating attachment relative to the workpiece in order to control the heating effect;

Figure 5 is a detail sectional view taken along line 5—5 of Figure 1;

Figure 6 is a front elevational view illustrating a means for controlling the shape of the heated area on the workpiece;

Figure 7 is a schematic view illustrating an alternative form of apparatus, in which a pair of reflectors are employed instead of one reflector and one lens;

Figure 8 corresponds generally to Figure 7 but shows a form of apparatus in which reflector means are employed to redirect the energy beam transmitted from the director to the concentrator, and Figure 9 is a schematic view illustrating a form of apparatus corresponding generally to that shown in Figure 1, but in which reflector means are employed to redirect the heat energy beam.

Stated generally, the present method and apparatus embody the concept of providing a source of radiant heat energy, employing director means to direct and transmit the radiant heat energy in a beam from the source to a point relatively adjacent the workpiece, and employing concentrator means to receive the beam and bring the same to an approximate focus on a predetermined area of the workpiece. The method and apparatus also include means for controlling the amount of heat transmitted to the workpiece, the shape and size of the area to which the heat is applied, and the lead time between heating of the area and operation thereon by the cutting or working tool.

Referring now to Figure 1 of the drawings, the source of radiant heat energy is indicated at 10, the director means at 11, and the concentrator means at 12. The control means comprise a device 13, represented as a mask, for controlling the cross-sectional shape of the beam as well as the amount of radiant heat energy transmitted from director means 11 to the workpiece. The controls also include a means 14 for varying the amount of heat emanating from the energy source 10, as well as a variety of means for adjusting the positions of the elements in order to vary the strength and focus of the beam and its point of application to the workpiece.

The present method and apparatus may be employed in connection with a variety of types of apparatus for machining and working metals, plastics and the like, but are illustrated in the drawings as utilized in connection with a typical engine lathe represented schematically at 16. Lathe 16 may be seen to comprise the ways 17, saddle 18, compound rest 19, tool bit holder 21, and tool bit 22, as well as the usual cranks and handles for adjusting the positions of these elements. Mounted between the headstock and tailstock, not shown, of lathe 16 is a workpiece 23 which in the present illustration is cylindrical. Suitable means, not shown, are provided for rotating workpiece 23 about its axis and at either a constant or a variable speed.

According to one preferred means for mounting the elements 10—13 in position relative to workpiece 23, and as illustrated in Figure 1, a pair of relatively large sized mounting members or ears 26 are fixedly mounted in upwardly extending parallel relation at opposite ends of saddle 18 over ways 17. The ears 26 are provided with relatively large sized annular openings 27, coaxial with workpiece 23, and have axially outwardly extending annular flanges 28 (Figure 2) over which are mounted the circular end portions 29 of arm plates 31 which project radially of workpiece 23 and parallel to each other. The arms 31 serve to mount in radially extending relation an elongated channel 32 which supports elements 10—13, the downwardly extending flanges 33 of the channel being in surface engagement with the outer ends of arms 31 as best shown in Figure 4. Elongated slots 34 are formed in arms 31 to receive bolts 36 (Figure 5) which project outwardly from channel flanges 33, there being wing nuts 37 provided to clamp the arms 31 and the channel together and prevent relative movement therebetween.

In order to shift the channel 32 outwardly and inwardly on a radius relative to workpiece 23, after loosening of wing nuts 37, a crank 38 is mounted on a shaft 39 (Figure 4) which extends through arms 31 and channel flanges 33 and has pinions 41 mounted thereon in spaced relation. The pinions 41 mesh with racks 42 which are welded on the underside of the web of channel 32, so that rotation of the crank 38 operates through shaft 39 and the pinions 41 to shift the racks and associated channel either outwardly or inwardly. Shaft 39 is journaled in suitable circular apertures in arm 31, and extends through elongated slots 43 in the channel flanges so that movement of the channel relative to the arms is permitted.

Not only may the channel or support member 32, and the associated elements 10—13 be shifted inwardly or outwardly relative to workpiece 23, but it may also be rotated about the workpiece axis due to shifting of the circular arm end portions 29 about the annular flanges 28 on mounting ears 26. In order to hold the arms 31, channel 33 and associated elements in the desired rotated position relative to workpiece 23, detent means are provided in the forms of pins 44 (Figure 2) adapted to seat selectively in a number of circumferentially spaced holes 46 in arcuate end portions 29. The pins 44 are associated with handles 47 which may be pulled to withdraw the pins from their associated holes 46, and springs 48 are provided in casings 49 on ears 26 for the purpose of urging the pins into the holes with which they are registered.

Proceeding next to a detailed description of the elements mounted on the channel 32 and adjustable therewith both rotationally and radially relative to workpiece 23 as described above, the source of radiant heat energy 10 is shown as an electric arc means comprising a pair of electrodes 51 aligned radially of workpiece 23 and having their ends closely adjacent each other. The inner electrode 51 is slidably positioned in a suitable holder 52 which may be adjusted along a slot 53 in the web of channel 32 upon loosening of a bolt 54 and its associated nut, not shown. The outer electrode 51 is slidably mounted in a bearing 56 which is integral with the casing 57 of an arc-length control of any suitable automatic or manual type. Casing 57, bearing 56, and the outer electrode 51 may also be shifted along slot 53 upon loosening of a nut 58, the latter being associated with a bolt which extends through the slot.

Power may be supplied to the arc-length control 57, and thus to the electrodes 51, through a power cord 59 in which is provided the means 14 for varying the power emanating from the source 10 of radiant heat energy. The means 14 preferably comprises a rheostat or potentiometer having a control knob 61 which may be turned when it is desired to alter the power output from the electric arc.

The director means 11 is shown in Figure 1 as comprising a parabolic reflector 62 the apex portion of which is apertured to permit insertion of the outer one of electrodes 51. Reflector 62 is pivotally mounted or trunnioned at 63 to the arm ends of a generally U-shaped mounting bracket 64, the base of the latter being longitudinally slotted to receive a bolt 66 which extends through slot 53. The reflector 62 may be pivoted or rotated about pivots 63, that is to say about an axis parallel to workpiece 23, and may also be pivoted about a transverse axis through bolt 66. Furthermore, upon loosening of bolt 66 relative to its associated nut, not shown, the bracket 64 and associated reflector 62 may be shifted along slot 53 and also transversely thereof due to shifting of the bolt relative to the slot in the base of bracket 64.

The concentrator means 12 illustrated in Figure 1 comprises a convex lens 67 of a suitable type having a high coefficient of radiant heat transfer, and mounted on a U-shaped bracket 68 corresponding to the bracket 64 for director 11. More specifically, the mounting rim for lens 67 is pivoted at 69, and the slotted base of bracket 68 is adapted to receive a bolt 69 which extends through a slot 71 in channel 32, the slot 71 being preferably aligned with slot 53. It follows that lens 67 may be pivoted about intersecting axes as well as shifted both longitudinally and transversely of channel 32.

As illustrated in Figure 1, the concentrator means 12 is located relatively adjacent the workpiece 23, or at the inner end portion of support channel 32, whereas the energy source 10 and the director means 11 are relatively remote from the workpiece or at the outer channel end portion. Furthermore, the sizes of brackets 64 and 68 are such that reflector 62 and lens 67 may be adjusted so that their axes lie along a radius of workpiece 23. It follows that radiant heat energy generated in the arc between electrodes 51 will be reflected by reflector 62 and directed in a beam, indicated by dashed lines 71a, which passes toward workpiece 23 and through lens 67. The lens 67 is so shaped that it will concentrate the beam to an approximate focus on a portion of the surface of workpiece 23, thereby reproducing at such portion a substantial percentage of the heat generated in the heat source.

The workpiece surface at the area receiving the focused beam of radiant heat energy is thus heated very rapidly to a temperature selected to effect the desired softening thereof. Thereafter, after the elapse of a predetermined lead time, the heated area rotates beneath the cutting tool 22, it being assumed that the direction of workpiece rotation is as indicated by arrow 72 in Figure 1. Since the mounting ears 26 are disposed on the lathe saddle 18, the entire heating attachment will move with the saddle longitudinally of workpiece 23, so that the point of focus of the energy beam will always be adjacent the tool bit 22 as desired.

The desired degree of focus of the beam on the workpiece may be maintained by merely loosening the wing nuts 37 and turning the crank 38 to shift channel 32 inwardly relative to the workpiece as stock is machined off. In addition to the manual control effected by handle or crank 38, which turns pinions 41 to shift racks 42 and channel 32, means may be provided to associate the cross feed screw of the lathe with pinions 41 so that inward shifting of channel 32 is effected automatically as the cutting tool bit 22 shifts toward the axis of workpiece 23 as stock is removed. Furthermore, in the case of tapered or irregular workpieces, this automatic connection between the cross feed screw and the pinions 41 operates to effect the desired focus automatically regardless of the portion of the work engaged by the tool 22.

If the various elements are so arranged that the beam 71 is brought to an exact focus on workpiece 23, the amount of heating will be the maximum which may be effected for a particular setting of knob 61 of control means 14. In order to reduce the temperature and increase the size of the area heated, it is merely necessary to reduce the degree of focus either by turning crank 38, shifting the lens 67 along slot 71, shifting reflector 62 along slot 53, or shifting the electrodes 51 relative to the reflector 62. Normally, the arc between electrodes 51 is at the point of focus of reflector 62, but may be shifted relative thereto when it is desired to alter the focus at the workpiece as above indicated.

The above-described arrangements by which reflector 62 may be either rotated or longitudinally or transversely shifted, as well as the arrangements by which lens 67 may be rotated or longitudinally or transversely shifted, mean that the attachment may be set up for a wide variety of conditions and types of work. After such set-up is made through loosening of the various elements 58, 54, 66, and 69, the set-up is normally maintained during a given operation and variation of focus is effected by loosening wing nuts 37 and turning crank 38 to shift conjointly the entire heating means. When it is desired to vary the lead time, and thus the time in which the heat in the heated area will penetrate into the work prior to its being operated upon by the tool bit 22, handles 47 (Figure 2) are pulled to withdraw pins 44 from holes 46, after which the entire attachment is rotated about flanges 28 to vary the distance between the focal point on the workpiece and the tool bit 22. When the desired lead time is achieved, the handles 47 are released and the pins 44 spring into registered holes 46 due to operation of springs 48. Lead time may also be varied by altering the speed of the lathe, which means that any degree of fine or coarse control of lead time may be effected.

There have been described above various means for controlling the amount of heat applied to the workpiece, the size and location of the heated area, and the lead time which will elapse between heating of an area and operation upon such area by the tool bit 22. Such means comprise, in summary, varying the arc power through use of the means 14, varying the focus through separate shifting of one or more of the elements, or varying the focus through shifting of all the elements conjointly through use of crank 38 and the associated racks and pinions. In order to provide an additional and very important control, the device 13 is provided, preferably either between director 11 and concentrator 12 or between concentrator 12 and workpiece 23, and comprises a mask adapted to permit selective amounts and cross-sectional areas of radiant energy to pass from director 11 to the workpiece.

The mask 13 is best illustrated in Figures 1 and 3 and may be seen to be formed of a rectangular frame 73, mounted on channel 32, and a plurality of shutters 74 extended between the side members of the frame in parallel relation and pivoted at one edge as indicated at 76. In order to move all of the shutters 74 conjointly, a control rod 77 is connected to pins 78 provided on the shutters remote from pivots 76 and which extend through arcuate slots 79 in the frame sides. It may be seen that raising or lowering of rod 77 effects pivotal movement of all of shutters 74 about their pivots 76 to thus vary, in the manner of a Venetian blind, the amount of radiant energy which may be transmitted from director 11 to concentrator 12.

The mask is constructed of a material, preferably metal, having a high coefficient of heat conduction and a high melting point so that it will not be adversely affected by the heat energy which it absorbs due to blocking a portion of the energy transmitted from the director to the concentrator. It will be understood, however, that the amount of energy absorbed by the means 13, and which must be removed through conduction and radiation, is not prohibitive since means 13 is preferably not operated upon by the beam after the beam is focused.

Referring next to Figure 6, an alternative form of the invention is illustrated in which the mask means 13 is replaced by a mask 13a which is constructed the same as the mask 13 of Figure 3, except that a profile member 80 is provided to control the cross-sectional shape of the beam and thus the shape of the heated area on workpiece 23. It will be understood that the opening 81 in profile member 80, which may comprise a sheet of heat resistant metal, may be of any shape as required by the particular machining operation being carried out. The device 13a thus controls not only the amount of energy transmitted from director 11 to the workpiece, but also the shape of the transmitted beam and the shape of the heated area on the workpiece. This very simple and effective means for controlling the heating effect and the shape of the heated area is to be contrasted with the induction heating practice, for example, in which a certain amount of stray current always results and in which a special coil must be designed to produce a heated area of each shape and size.

Referring next to Figure 7, another embodiment of the invention is illustrated schematically, and in which like parts are given like numbers except followed by the letter "b." In this case the construction is the same as that shown in Figure 1, except that the concentrator 12b comprises a second parabolic reflector instead of the lens shown in Figure 1. This construction is advantageous for certain types of constructions, particularly on machines other than lathes, and where it is not desired that the heat beam pass through a lens.

Referring next to Figure 8, an embodiment is illustrated which corresponds to that shown in Figure 7, the corresponding part numbers being followed by the letter "c," except that a reflector 82 is interposed between mask 13c and workpiece 23c. Reflector 82 is preferably a plane surface having a high coefficient of reflection, and serves to redirect the energy beam from director 11c it then being no longer necessary that the director 11c line up with a radius of the workpiece 23c. Figure 9 illustrates a corresponding structure, the numbers being followed by the letter "d," in which the reflector 82 is provided in a system utilizing both a parabolic reflector 11d and a lens 12d of the type shown in Figure 1. It is to be understood that in addition to using a simple parabolic reflector 11 or lens 12, various other combinations of lenses and reflectors, and various other types of lenses and reflectors, may be employed. For example, the reflector 62 may be a compound type embodying two sizes of parabolas, whereas the lens 67 may also be a compound type. Furthermore, either director 11 or concentrator 12 may embody both a lens and a reflector, for example where it is desired to reduce the size of the heating attachment.

In carrying out the method of the invention, a source of radiant heat energy is provided and the energy therefrom is directed in a beam to a point relatively adjacent the workpiece. The beam at such adjacent point is then concentrated to an approximate focus on the workpiece for the purpose of bringing a predetermined area of the workpiece to a selected temperature which is the optimum one for the hot machining operation being performed. More specifically, and with the apparatus illustrated in Figure 1, the method comprises supplying electrical power through control means 14 and power cord 59 to the electrodes 51 so that an arc is struck therebetween at approximately the focus point of parabolic reflector 62, the arc being maintained due to operation of the arc length control within casing 57. The radiant heat energy from the arc is then directed by reflector 62 in a beam 71a through the mask device 13, which is set so that its shutters 74 permit the desired amount of energy to be transmitted to concentrator 12. Concentrator 12, illustrated as the convex lens 67, then brings the beam to an approximate focus on the surface of workpiece 23 at a point arcuately spaced from the cutting tool bit 22. The area of the workpiece against which the beam is directed is thus heated very rapidly to a temperature dependent upon the setting of knob 61, the degree of focus, and the setting of mask 13. When it is desired to vary the lead time, the entire attachment is rotated about the workpiece by removing pins 44 from their associated holes 46 as described above, or by altering the speed of operation of the lathe. The shape of the heated area may be controlled by placing profile members 80, having openings 81 of various shapes and sizes, at any desired point along the path of the beam.

While the particular method and apparatus herein described in detail are fully capable of attaining the objects and providing the advantages hereinbefore stated, it is to be understood that they are merely illustrative of the presently preferred embodiments of the invention and that no limitations are intended other than as defined in the appended claims.

I claim:

1. Apparatus for hot machining and hot working metals, plastics, and similar materials both electrically conductive and electrically non-conductive, which comprises a source of radiant heat energy, director means to direct and transmit radiant heat energy in a beam from said source to a point removed from said source and from said director means, concentrator means located at said point to receive said beam and bring the same to an approximate focus on a portion of a workpiece to effect heating of said portion, and tool means to operate on said heated portion of said workpiece.

2. The invention as claimed in claim 1, in which means are provided to effect a predetermined relative operating movement between said workpiece and tool means, and in which the positions of said source, director means and concentrator means are correlated to said operating movement in such a way as to provide a predetermined time lag between heating of a portion of said workpiece and operation on said portion by said tool means.

3. The invention as claimed in claim 2, in which means are provided to vary said time lag.

4. The invention as claimed in claim 1, in which said heat source, director means and concentrator means are movable relative to said workpiece, relative to said tool and relative to each other in order to vary the amount of radiant heat energy transmitted to said workpiece, the portion of said workpiece on which said beam is focused, and the degree of focusing effected.

5. The invention as claimed in claim 1, in which means are provided to vary the amount of radiant heat energy emitted by said source.

6. The invention as claimed in claim 1, in which means are provided to effect conjoint movement of said heat source, director means and concentrator means relative to said workpiece and to said tool, in order to create a predetermined focus of said beam on said workpiece.

7. An attachment for a lathe including means for feeding a cutting tool both longitudinally and transversely of a workpiece, said tool and workpiece rotating relative to each other; which attachment comprises a source of radiant heat energy removed from said workpiece, director means to direct and transmit radiant heat energy in a beam from said source to a location relatively adjacent said workpiece, and concentrator means disposed at said location to receive said beam and bring the same to a point of approximate focus on a relatively small portion of said workpiece prior to relative movement of said portion beneath said cutting tool, said point of focus being so located relative to said tool that a predetermined lead time elapses between heating of said portion by said beam and relative movement of said portion beneath said tool.

8. The invention as claimed in claim 7, in which means are provided to vary said lead time.

9. The invention as claimed in claim 8, in which said means to vary said lead time includes a support adapted to be rotated about said workpiece, and on which said source, said director means and said concentrator means are mounted.

10. The invention as claimed in claim 7, in which means are provided to effect automatically movement of said point of focus longitudinally of said workpiece in accordance with the longitudinal feed of said cutting tool.

11. An attachment for a lathe, which comprises mounting means adapted to be mounted on the saddle of said lathe, arm means mounted on said mounting means for rotation about the axis of said lathe, means to position said arm means at various rotated positions about said axis, support means movably mounted on said arm means and extending radially from said axis, means to move said support means toward and away from said axis, a source of radiant heat energy mounted on said support means remote from said axis, director means mounted on said support means to direct and transmit radiant heat energy in a beam from said source toward said axis, and concentrator means mounted on said support means adjacent said axis to bring said beam to a focus on a workpiece mounted in said lathe.

12. The invention as claimed in claim 11, in which a variable shutter mask is mounted on said support means to prevent selected portions of said beam from reaching said workpiece.

13. A method of hot machining and hot working metals, plastics, and similar materials both electrically conductive and electrically non-conductive, which comprises providing a source of radiant heat energy, directing radiant heat energy in a beam from said source toward a workpiece, bringing said beam to an approximate focus on a portion of a workpiece to effect heating of said portion, and operating on said heated portion with a tool means.

14. Apparatus for hot machining metals, plastics, and similar materials both electrically conductive and electrically non-conductive, which comprises a cutting tool, means to move said cutting tool and a workpiece relative to each other and along a predetermined path to thereby effect removal by said cutting tool of material along said path, a source of radiant heat energy disposed remote from said workpiece and from said cutting tool, director means to receive radiant heat energy from said source and to direct and transmit such energy in a beam to a point remote from said source, and concentrator means disposed at said point to receive said beam and bring the same to an approximate focus on said path in advance of said cutting tool, whereby material on said path is heated by said concentrated beam prior to being removed by said cutting tool.

15. Apparatus for hot machining metals, plastics, and similar materials both electrically conductive and electrically non-conductive, which comprises a cutting tool, means to move said cutting tool and a workpiece relative to each other and along a predetermined path to thereby effect removal by said cutting tool of material along said path, a source of radiant heat energy disposed remote from said workpiece and from said cutting tool, director means to receive radiant heat energy from said source and to direct and transmit such energy in a beam to a point remote from said source, concentrator means disposed at said point to receive said beam and bring the same to an approximate focus on said path in advance of said cutting tool to thus heat workpiece material prior to removal of such material by said cutting tool, and means to maintain the focus of said concentrated beam on said path to a predetermined degree and over a predetermined, relatively small workpiece area located a predetermined distance from said cutting tool to thus insure controlled heating of said workpiece area and controlled lead time prior to cutting for optimum cutting efficiency and minimum effect upon portions of said workpiece remote from said area.

16. The invention as claimed in claim 15, in which said last-named means includes means to determine the exact shape and boundaries of said relatively small area.

17. A method of hot machining metals, plastics and similar materials both electrically conductive and electrically non-conductive, which comprises relatively moving a workpiece and a cutting tool along a predetermined path to thus effect removal by said cutting tool of workpiece material along said path, providing a source of radiant heat energy remote from said cutting tool and from said workpiece, directing and transmitting radiant heat energy from said source to a point adjacent said workpiece, and concentrating said radiant heat energy a predetermined amount and over a predetermined workpiece area on said path and located a predetermined distance in advance of said cutting tool, thereby to effect controlled heating of said area prior to removal thereof by said cutting tool.

18. Apparatus for hot machining metals, plastics, and similar materials both electrically conductive and electrically non-conductive, which comprises a cutting tool, actuating means to effect continuous and controlled movement of said cutting tool and a workpiece relative to each other and along a predetermined path to thereby effect removal by said cutting tool of workpiece material along said path, electric arc means located remote from said workpiece and from said cutting tool, means to control the heat energy emitted from said electric arc means, a parabolic reflector located adjacent said electric arc means to receive radiant heat energy therefrom and transmit said radiant heat energy in a beam to a point remote from said electric arc means, a lens mounted at said point to effect concentration of said beam and bring said beam to an approximate focus on said workpiece along said path in advance of said cutting tool, and mounting and control means to effect controlled movement of said electric arc means, said parabolic reflector and said lens in relation to the movement of said cutting tool and workpiece to thus maintain the focus of said beam on said path to a predetermined degree and over a predetermined area located a predetermined distance from said cutting tool, thereby insuring controlled heating of said workpiece area and controlled lead time prior to cutting for optimum cutting efficiency and minimum effect upon portions of said workpiece remote from said area.

References Cited in the file of this patent

UNITED STATES PATENTS

| | | |
|---|---|---|
| 260,657 | Calver | July 4, 1882 |
| 1,263,234 | Hanson | Apr. 16, 1918 |
| 1,303,273 | Evans | May 13, 1919 |
| 1,402,816 | Wallis | Jan. 10, 1922 |
| 1,535,314 | Julin | Apr. 28, 1925 |
| 1,559,838 | Anthony | Nov. 3, 1925 |
| 1,986,052 | Ferree | Jan. 1, 1935 |
| 2,028,293 | O'Brien et al. | Jan. 21, 1936 |
| 2,339,158 | Drake | Jan. 11, 1944 |
| 2,364,730 | Leskin | Dec. 12, 1944 |
| 2,412,797 | Berliner | Dec. 17, 1946 |
| 2,568,435 | Downey | Sept. 18, 1951 |
| 2,595,905 | Telkes | May 6, 1952 |
| 2,600,453 | Weingart | June 17, 1952 |
| 2,611,855 | Turner | Sept. 23, 1952 |

FOREIGN PATENTS

| | | |
|---|---|---|
| 802,162 | Germany | Feb. 5, 1951 |